(12) United States Patent
Dubroeucq et al.

(10) Patent No.: US 7,647,641 B2
(45) Date of Patent: Jan. 12, 2010

(54) METHOD AND SYSTEM FOR CONDITIONAL ACCESS APPLIED TO PROTECTION OF CONTENT

(75) Inventors: Gilles Dubroeucq, Paris (FR); Jean-Pierre Vigarie, Cesson-Sevigne (FR)

(73) Assignee: Viaccess, Paris la Defense Cedex (FR)

( * ) Notice: Subject to any disclaimer, the term of this patent is extended or adjusted under 35 U.S.C. 154(b) by 522 days.

(21) Appl. No.: 10/584,511

(22) PCT Filed: Dec. 23, 2003

(86) PCT No.: PCT/FR03/50207

§ 371 (c)(1),
(2), (4) Date: Jun. 23, 2006

(87) PCT Pub. No.: WO2005/071963

PCT Pub. Date: Aug. 4, 2005

(65) Prior Publication Data

US 2007/0150960 A1   Jun. 28, 2007

(51) Int. Cl.
*H04N 7/16* (2006.01)
*H04N 7/167* (2006.01)
*H04L 9/00* (2006.01)
*H04L 29/06* (2006.01)

(52) U.S. Cl. .................. 726/27; 380/210; 380/259; 713/150; 726/4

(58) Field of Classification Search ........................ None
See application file for complete search history.

(56) References Cited

U.S. PATENT DOCUMENTS 5,991,400 A * 11/1999 Kamperman ............ 380/239
2001/0014974 A1   8/2001 Asada et al.

FOREIGN PATENT DOCUMENTS

| EP | 0 691 787 A1 | 7/1995 |
| EP | 0 858 184 A2 | 1/1998 |
| EP | 0 936 774 A1 | 2/1998 |

* cited by examiner

*Primary Examiner*—Kaveh Abrishamkar
(74) *Attorney, Agent, or Firm*—Nixon Peabody LLP

(57) ABSTRACT

The invention relates to an access control method controlling access to a broadcast digital dataflow previously scrambled.

The method according to the invention includes the following steps:
On transmission:
generating an entitlement control message R-$ECM_c$ for recording the content of the flow as a function of a key $KR_c$ and at least one criterion CRR defining a right to the record,
generating an entitlement control message P-$ECM_c$ controlling access to play back the content of the recorded flow as a function of a key $KP_c$ and at least one criterion CRP defining a right to play back, and
on reception:
analysing the messages P-$ECM_c$ and P-$ECM_c$,
authorizing the recording and playback if the criteria CRR and CRP are verified.

24 Claims, 4 Drawing Sheets

METHOD AND SYSTEM FOR CONDITIONAL ACCESS APPLIED TO PROTECTION OF CONTENT

CROSS-REFERENCE TO RELATED APPLICATION

This application claims priority based on International Patent Application No. PCT/FR2003/050207 filed on Dec. 23, 2003, entitled "Method and System for Conditional Access Applied to Protection of Content" by Gilles Dubroeucq and Jean-Pierre Vigane.

DISCLOSURE

1. Technical field

This invention relates to the field of access control and is particularly applicable to a method and system for sending/receiving information, with access control through an MPEG2 broadcasting network. This method is applicable to any multiplexed dataflow based on the use of packets or frames.

The invention is also related to a scrambling platform and a descrambling receiver designed for use with this method.

More specifically, the invention relates to an access control method and system controlling access to a broadcast digital dataflow previously scrambled by an encryption key CW transmitted in encrypted form in an ECM (Entitlement Control Message), including at least one access control criterion CA controlling access to data in the flow. The transmitted data could be decrypted instantly during transfer or recorded as such in a receiving terminal.

2. State of Prior Art

It is of overriding importance for operators to protect data and services distributed on line, particularly through the Internet network, during the broadcasting phase and after broadcasting of data, so as to guard against pirating of these data.

FIG. 1 shows an overview of an access control system according to prior art in which a scrambling platform 2, usually arranged at the entry to the network, receives an unencrypted flow $F_x$ and outputs an encrypted content $F_{xs}$ to a receiving terminal 4. The platform 2 contains a generator 6 of scrambling and descrambling keys Cwi, a generator 8 of Entitlement Control Messages (ECM), and a generator 10 of Entitlement Management Messages (EMM). The receiving terminal 4 includes a descrambling module 12, a security processor 14 including a decryption module 16 of the control keys $CW_i$ and a memory 18.

Before dataflows can be broadcast, the dataflows are scrambled by the scrambling platform 2 using keys CWi. The descrambling keys $CW_i$ are transmitted to the terminals 4 in encrypted form inside entitlement control messages (ECM) with at least one access control criterion CA, in order to enable descrambling of the content of the broadcast flows. After using a comparator 20 to check access criteria with rights previously transmitted to the terminals 4 in entitlement management messages (EMM) and registered in the memory 18, the descrambling keys $CW_i$ are decrypted and then transmitted to the descrambling module 12.

The descrambling keys $CW_i$ change regularly on crypto-periods $CP_i$ (typically a few seconds) and are usually applied to the descrambler 12 by pairs $[Cw_i, CW_{i+1}]$ where $CW_i$ represents the descrambling key valid during the crypto-period $CP_i$, and $CW_{i+1}$ represents the descrambling key valid for the crypto-period $CP_{i+1}$, so as to improve the global security of the system. Each descrambling key to be used is referenced by a bit indicating the parity of i such that two descrambling keys, one even ECW and one odd OCW, are configured on the descrambler at each ECM change, before the crypto-period is effectively changed.

One known technique for protecting the content once it has been broadcast in a remote broadcasting context, consists of recording this content with the associated conditional access signal.

A first disadvantage of this solution is due to the fact that it makes it impossible to associate distinct access criteria for the:
- direct content viewing phase from the flow;
- the content recording phase; and
- the flow display phase from the locally recorded content.

A second disadvantage of this technique is due to the fact that the secret operating keys stored in a security processor and used for decryption of the ECMs are regularly updated. In this case, the ECMs stored with the content are no longer valid and the content becomes unusable even if the client has acquired usage rights beyond this period.

A third disadvantage is related to synchronisation aspects between the supply and operation of descrambling keys $CW_i$ during use of a recorded content. In this case, the backward read function cannot be done simply because the anticipated value of the next descrambling key (representing the previous descrambling key) is not provided in the ECM.

Another technique known in prior art to protect the content is to use a so-called DRM (Digital Right Management) solution.

This type of solution is based on:
- the use of certificates to set up a line of trust between the components of the system;
- encryption or pre-scrambling of the content using a private key algorithm;
- sending of this private key associated with usage rights on line to form an encrypted license using an encryption algorithm using a public key of the client.

This solution is not adapted to the context of remote broadcasting wherein a backward channel is not used systematically. Furthermore, this type of solution cannot make access to the content dependent on the possession of rights registered indifferently by radio or on line in a security processor.

The purpose of the invention is to overcome the disadvantages of prior art described above using a method and a device using a scrambling method based on periodic changes of control words and assuring upwards compatibility with earlier conditional access systems.

PRESENTATION OF THE INVENTION

The invention relates to an access control method controlling access to a broadcast digital dataflow previously scrambled using an encryption key CW transmitted in an entitlement control message ECM also including at least one access control criterion CA, said digital data possibly being recorded as such in a receiving terminal or decrypted during transfer.

According to the invention, this method includes the following steps:

On transmission:
  generating an entitlement control message R-ECM$_c$ for recording the content of the flow as a function of a recording key KR$_c$ and at least one criterion CRR defining a right to the record,
  generating an entitlement control message P-ECM$_c$ controlling access to play back the content of the recorded flow as a function of a playback key $KP_c$ and at least one criterion CRP defining a right to play back, and on reception:

analysing the message $R\text{-}ECM_c$, and authorising the recording if the criterion CRR is verified, otherwise prohibit the recording, analysing the message $P\text{-}ECM_c$, and authorising the playback if the criterion CRP is verified, otherwise prohibit the playback.

According to a first variant embodiment of the method according to the invention, the keys CW, $KR_c$ and $KP_c$ are encrypted by a first service key $K_s$.

According to a second variant embodiment of the method according to the invention, the keys CW, $KR_c$ and $KP_c$ are encrypted by three different service keys, namely $K_S$, $K_{SR}$ and $K_{SP}$ respectively.

In a first embodiment, the sending phase includes the following steps:

for each dataflow:

breakdowning the scrambling period into a sequence of crypto-periods $CP_i$ each defining a validity duration of an individual key $CW_i$, and at each crypto-period change, scrambling the content of the flow using the key $CW_i$, and memorise a value p(i) representative of the parity of i, calculating an entitlement control message $SC\text{-}ECM_i$ as a function of the previously defined encryption keys $CW_{i-1}, CW_i, CW_{i+1}$, the value p(i) and the criterion $CA_i$, said message $SC\text{-}ECM_i$ being intended to transport access rights to a data segment $S_i$ corresponding to at least two crypto-periods, encrypting the keys $CW_{i-1}$, $CW_i$, $CW_{i+1}$ using the playback key $KP_c$, encrypting the result of the encryption in the previous step using a second service key $K'_s$, encrypting the result of the encryption in the previous step using the recording key $KR_c$.

In a second embodiment, the emission phase includes the following steps:

for each dataflow:

breakdowning the scrambling period into a sequence of crypto-periods $CP_i$ each defining a validity duration of an individual key $CW_i$, and at each change of crypto-period i, scrambling the content of the flow using the key $CW_i$, and memorise a value p(i) representative of the parity of i, calculating an entitlement control message $SC\text{-}ECM_i$ as a function of the previously defined encryption keys $CW_{i-1}, CW_i, CW_{i+1}$, the value p(i) and the criterion $CA_i$, said message $SC\text{-}ECM_i$ being designed to carry access rights to a data segment $S_i$ corresponding to at least two crypto-periods, encrypting the keys $CW_{i-1}$, $CW_i$, $CW_{i+1}$ using a second service key $K'_s$, encrypting the result of the encryption in the previous step using the playback key $K_c$, encrypting the result of the encryption in the previous step using the recording key $KR_c$, In both embodiments, the sending phase also includes the following steps:

calculating the entitlement control message $ECM_i = f[(ECW_i, OCW_i, CA)]$ wherein $ECW_i$ and $OCW_i$ represent the even and odd control words previously encrypted using a first service key $K_s$, respectively, $ECW_i = CW_i$ if i is even, otherwise $ECW_i = CW_{i+1}$;

$OCW_i = CW_i$ if i is odd, otherwise $OCW_i = CW_{i+1}$;

broadcasting parameters in the ECM signal, identifying the ECM channels attached to the service broadcasting the content of messages $ECM_i$, $P\text{-}ECM_c$, $R\text{-}ECM_c$, $SC\text{-}ECM_i$, providing the $ECM_i$, $P\text{-}ECM_c$, $R\text{-}ECM_c$, $SC\text{-}ECM_i$ messages to the receiving terminal.

Two message dispatching modes $ECM_i$, $P\text{-}ECM_c$, $R\text{-}ECM_c$, $SC\text{-}ECM_i$ are possible. These messages may be broadcast either on the ECM channel associated with the content of segment $S_i$, or output partly to the receiving terminal from an Authorisation Server at the entry to the network on request and as a function of the envisaged type of use of the content.

Thus, the R-ECM and/or P-ECM messages can be output to the receiving terminal on request from an Authorisation Server at the network entry if the recording and/or playback are expected.

According to the invention, the reception phase in which the flow is received directly includes the following steps:

recovering the ECM channel from the $ECM_i$ message, using the signal attached to the service broadcasting the dataflow, and at each change of i, analysing the message $ECM_i$ so as to recover the even control word OCW and the odd control word ECW, to descramble the content of the broadcast flow so as to obtain direct access to this content.

The reception phase includes the following steps, to record the received flow:

recovering the ECM channel from the $P\text{-}ECM_c$, $R\text{-}ECM_c$, $SC\text{-}ECM_i$ messages, from the signal attached to the service broadcasting the content;

analysing the $R\text{-}ECM_c$ message to verify record access criteria CRR memorising the recording key $KR_c$;

recovering the message $P\text{-}ECM_c$ and store it with the content; and for each crypto-period i:

recovering the message $SC\text{-}ECM_i$, decrypting the message $SC\text{-}ECM_i$ using the recording key $KR_c$, and recording the decrypted message $SC\text{-}ECM_I$ with the content.

According to the invention, playback access to the recorded flow content is obtained according to the following steps:

recovering the message $P\text{-}ECM_c$ in the content and analyse it to verify read access criteria CRP, memorising the playback key $KP_c$; and recovering the current $SC\text{-}ECM_i$ message in the content;

decrypting the $SC\text{-}ECM_i$ message with the playback key $KP_c$ and verify access criteria, recovering the encrypted keys $CW_{i-1}, CW_i, CW_{i+1}$ and the value p(i) indicating the parity of i, and using the second key $K'_s$ to decrypt said keys depending on the read direction to deduce ECW and OCW from them; then applying either ECW or OCW to descramble the content when playing back.

In another variant, access to play back the content of the flow is obtained according to the following steps:

recovering the message $P\text{-}ECM_c$ in the content, analysing the message $P\text{-}ECM_c$ to verify read access criteria CRP, memorising $KP_c$, and recovering the current $SC\text{-}ECM_i$ message in the content, decrypting the $SC\text{-}ECM_i$ message with the second service key $K'_s$ and verify access criteria, recovering the encrypted keys $CW_{i-1}$, $CW_i$, $CW_{i+1}$ and the value p(i) indicating the parity of i, and using the second key KRc to decrypt said keys depending on the direction of read to deduce ECW and OCW; then applying either ECW or OCW to descramble the content.

Preferably, the reception phase also includes the following steps:

generating a local key $K_I$ from attributes contained in the message R-ECM and at least one parameter related to the identity of the receiving terminal, locally over-encrypting the content to be recorded with this key $K_I$.

when playing back, regenerating the key $K_I$ using attributes contained in the message P-ECM and at least one parameter related to the identity of the receiving terminal, decrypting the recorded content using the regenerated key $K_I$.

In one particular application of the method according to the invention, the broadcast digital data represent audiovisual programs.

The invention also relates to an access control system controlling access to a digital dataflow including a scrambling platform including at least one generator of entitlement control messages ECM and at least one descrambling receiver provided with a security processor.

According to the invention, the scrambling platform also includes:

a generator of entitlement control messages $R-ECM_c$ when recording the content of the received flow and a generator of entitlement control messages $P-ECM_c$ when playing back the content of a recorded flow, and the descrambling receiver, includes:

means of recovering the ECM channel from $P-ECM_c$, $R-ECM_c$ messages, means of decrypting the content of a received flow to record it, means of decrypting the content of a recorded flow to play it back.

Preferably, the descrambling receiver also includes means of generating a local key $K_I$ from attributes contained in the R-ECM message and the identity of the receiving terminal to locally encrypt/decrypt the content of the received flow.

The invention also relates to a scrambling platform including at least one generator of entitlement control messages ECM controlling access to a dataflow broadcast in scrambled form, a generator of entitlement control messages $R-ECM_c$ to control recording the content of a received flow and a generator of entitlement control messages $P-ECM_c$ to control playing back the content of a recorded flow.

The scrambling platform also includes:

means of breaking down the scrambling period into a sequence of crypto-periods $CP_i$ each defining a validity duration of an individual key $CW_i$, means of encrypting the content of the flow at each change of the crypto-period i using the key $CW_i$, means of calculating an entitlement control message $SC-ECM_i$ as a function of the keys $CW_{i-1}$, $CW_i$, $CW_{i+1}$ corresponding to crypto-periods $CP_i$, $CP_{i-1}$ and $CP_{i+1}$ respectively, a parity parameter p(i) and the access control criterion $CA_i$, said message $SC-ECM_i$ being intended to carry access rights to a data segment $S_i$ corresponding to at least two crypto-periods, means of encrypting the keys $CW_{i-1}$, $CW_i$, $CW_{i+1}$ using a playback key $KP_c$, means of encrypting the encryption result in the previous step using a second service key $K'_s$, means of encrypting the result of the encryption in the previous step using a recording key $KR_c$.

The invention also relates to a descrambling receiver of a dataflow broadcast in scrambled form using a scrambling key $CW_i$ including a security processor wherein at least one recording key $KR_c$ is memorised and that will be used to descramble record entitlement control messages $R-ECM_c$ and at least one playback key $KP_c$ intended to descramble the playback entitlement control messages $P-ECM_c$.

According to the invention, this receiver includes:

means of recovering the ECM channel from $P-ECM_c$ messages and $R-ECM_c$ messages from the signal attached to the service broadcasting the content;

means of decrypting the message $R-ECM_c$ using the recording key $KR_c$ to verify the right to record the content of a received flow, means of decrypting the message $P-ECM_c$ using the playback key $KP_c$ to verify the right to play back the content of a recorded flow.

Preferably, the receiver according to the invention also includes means of generating a key $K_I$ from the identify of the receiver to locally encrypt and decrypt the content of the received flow.

In one preferred embodiment of the invention, the security processor is a smart card.

BRIEF DESCRIPTION OF THE DRAWINGS

Other characteristics and advantages of the invention will become clear from the following description, given as a non-limitative example with reference to the appended figures wherein.

DETAILED PRESENTATION OF PARTICULAR EMBODIMENTS

The following description will be given in the framework of a particular application wherein broadcast flows represent audiovisual programs requiring an access right.

In this application, the process is based on broadcasting the content through a structure of multiplexed packets the form of which is given in appendix 1.

The signal of the program broadcasting the content includes a precise description indicating multiplex channels by a Packet Identifier used on reception of the content and the nature of the data transmitted in each channel (sound, video or other component).

This signal includes a conditional access descriptor "CA_descriptor" indicating the presence and location of channels carrying ECMs. This descriptor is associated either with the global level of the program or with each declaration of a component channel.

The format of this descriptor is standard in the case of a MPEG2 ISO13818-1 broadcast represented in appendix 2.

Private data "private_data_byte" for the method described are described in appendix 3 for one embodiment.

They have a suffix XID in the header of ECMs and are used as a discriminator to distinguish between different ECMs transported on the same packet channel.

The following combinations are possible when part of the $ECM_i$, $P\text{-}ECM_c$, $R\text{-}ECM_c$, $R\text{-}ECM_c$, $SC\text{-}ECM_i$ channels is missing:

- channel $ECM_i$ missing: no immediate display;
- channel $R\text{-}ECM_c$ missing: recording prohibited or if the receiving terminal has an operational return channel, connect to a network entry Authorisation Server delivering the $R\text{-}ECM_c$ message necessary to record the content;
- channel $P\text{-}ECM_c$ missing: read prohibited or if the receiving terminal has an operational return channel, connect to a network entry Authorisation Server outputting the $P\text{-}ECM_c$ message necessary to read the recorded content;
- channel $SC\text{-}ECM_i$ missing: $R\text{-}ECM_i$ and $P\text{-}ECM_i$ are then missing and recording is not authorised.

The payload may or may not be encrypted by the scrambling platform 2 depending on the nature of transmitted data (signal or audio or sound component) and the value of the "Scrambling Control" field is equal to one of the following values:

- the packet is not scrambled,
- the packet is scrambled using the even control word ECW,
- the packet is scrambled using the odd control word OCW.

Figure 1:
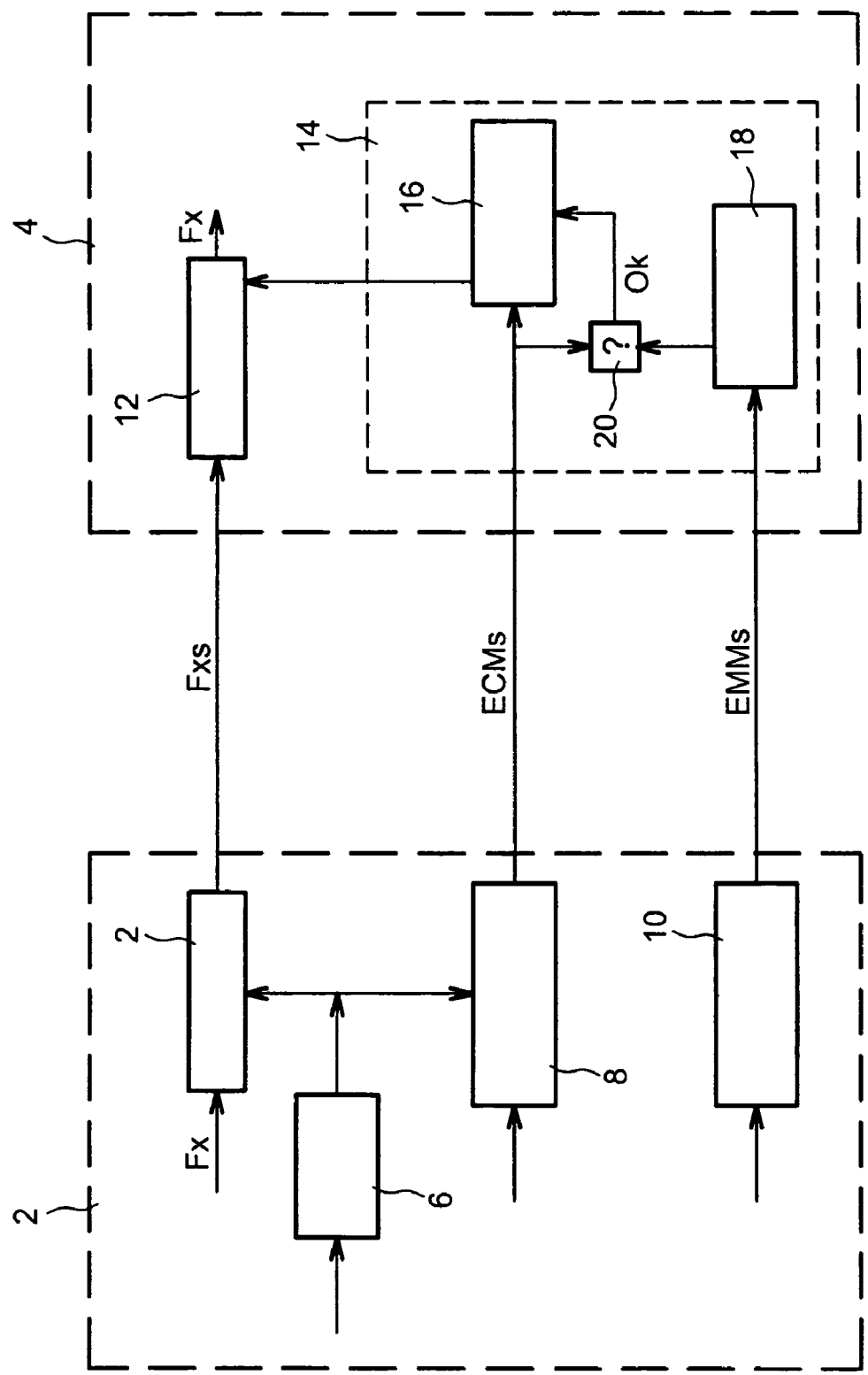
FIG. 1 described above shows a block diagram of an access control system according to prior art.
Figure 2:
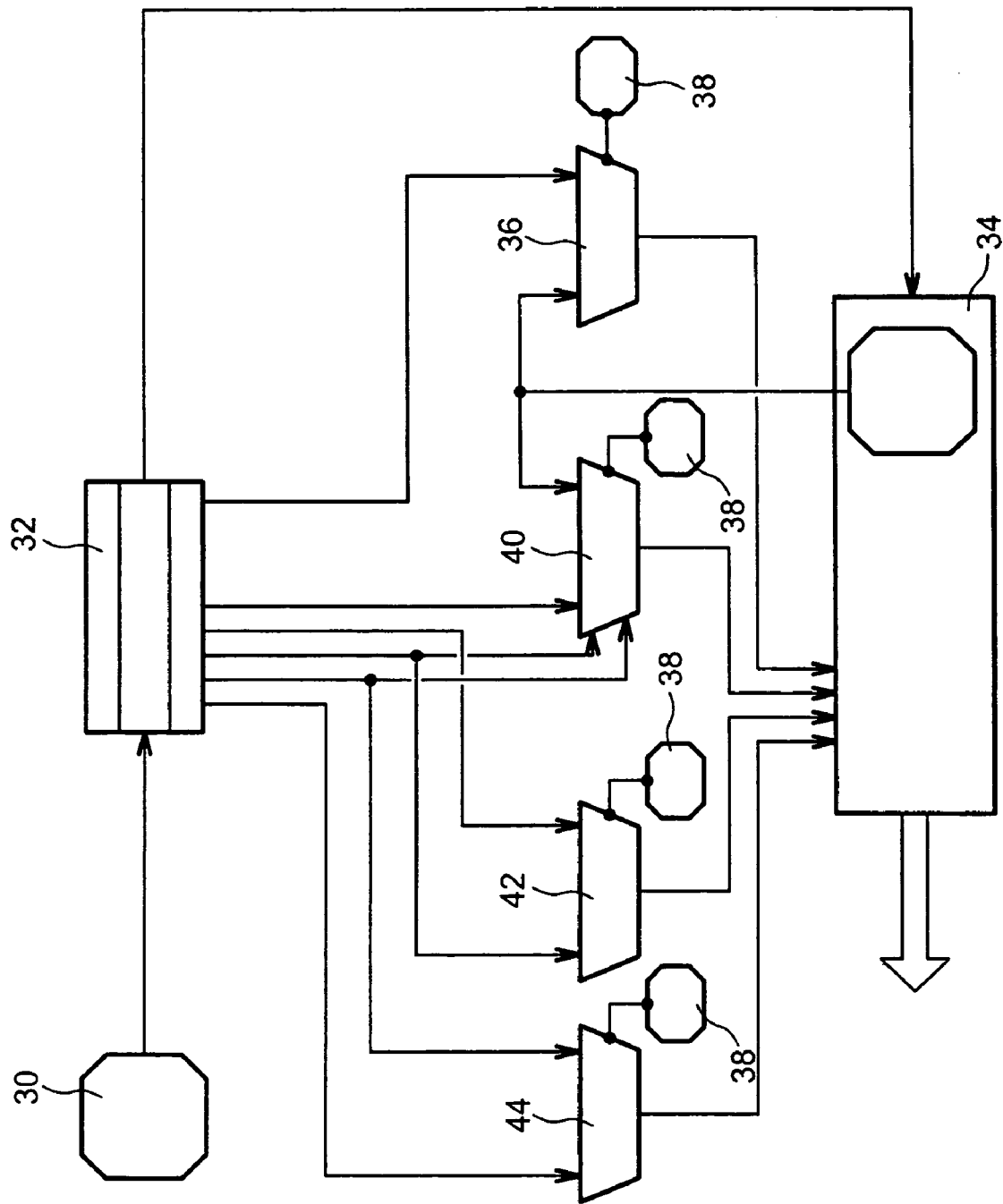
FIG. 2 is a block diagram showing the scrambling phase of flows to be broadcast by an access control system according to the invention, FIG. 3 diagrammatically shows the access control method controlling recording of a dataflow according to the invention, FIG. 4 diagrammatically shows the access control method controlling access to play back the recorded dataflow according to the invention.

FIG. 2 diagrammatically shows the scrambling phase of flows to be broadcast by an access control system according to the invention.

Step 30 consists of generating a recording secret access control key $KR_c$ controlling access to recording and a secret playback access control key $KP_c$ controlling access to play back.

Step 32 consists of breaking down the scrambling period for each dataflow into a sequence of crypto-periods $CP_i$ each defining a validity duration of an individual key $CW_i$. The packets thus formed are then applied to a scrambling and multiplexing module 34 that receives an $ECM_i$ message in parallel containing the descrambling keys $CW_i$, $CW_{i+1}$ controlling entitlement to the content of the flow and at least one access criterion $CA_i$, a message $SC\text{-}ECM_i$ containing the descrambling keys $CW_{i-1}$, $CW_i$, $CW_{i+1}$ controlling entitlement to the content of a data segment $S_i$ corresponding to at least two crypto-periods, a message $R\text{-}ECM_c$ containing a recording key $KR_c$ controlling recording of the content of the segment $S_i$ and at least one criterion CRR defining a right to record this content, and a message $P\text{-}ECM_c$ containing the playback key $KP_c$ controlling access to play back the content of the recorded segment $S_i$ and at least one criterion CRP controlling access to play back the content of this segment.

Before this, in step 36, the descrambling keys $CW_i$, $CW_{i+1}$ are encrypted using a first secret service key $K_s$ extracted from a smart card 38 and in step 40, the descrambling keys $CW_{i-1}$, $CW_i$, $CW_{i+1}$ are encrypted successively by the recording key $KR_c$ then by the playback key $KP_c$ in step 42, the key $KP_c$ is encrypted by a second service key $K'_s$ extracted from the smart card 38, and in step 44 the key $KR_c$ is encrypted by the second service key $K'_s$.

The messages $ECM_i$, $R\text{-}ECM_i$, $P\text{-}ECM_i$ and $SC\text{-}ECM_i$ to be broadcast are then applied to the scrambling and multiplexing module 34 to be multiplexed with the data packet and transmitted to the receiving terminal.

Note that step 42 is equivalent to over-encryption of control words $CW_{i-1}$, $CW_i$, $CW_{i+1}$ in sequence using the playback key $KP_c$, the second service key $K'_s$, and then the recording key $KR_c$.

In one variant embodiment, this over-encryption of control words $CW_{i-1}$, $CW_i$, $CW_{i+1}$ is done in sequence using the key $K'_s$, using the playback key $KP_c$, and then using the key $KR_c$.

Figure 3:
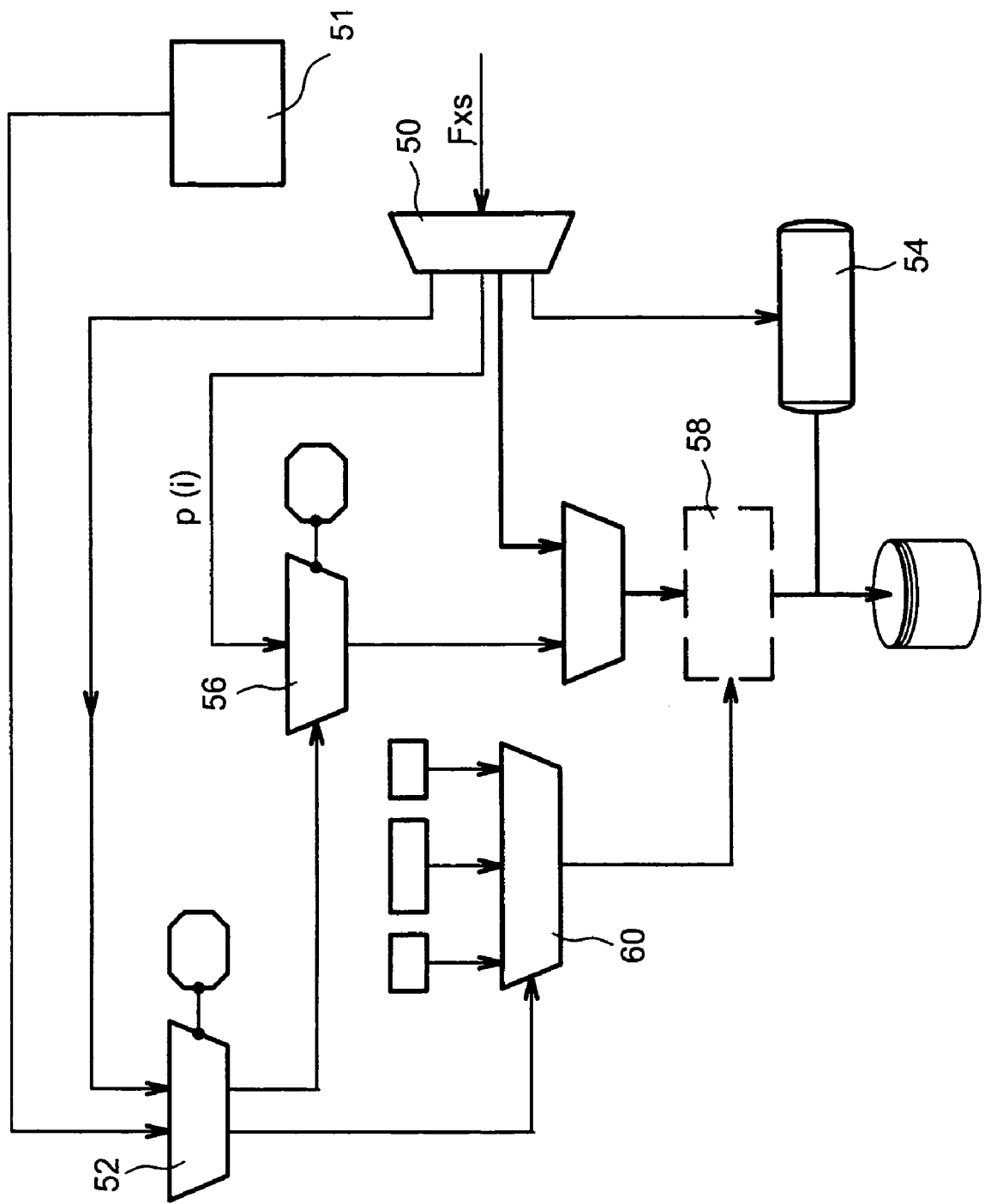

FIG. 3 diagrammatically shows the reception and descrambling phase of a broadcast content in order to record it.

Step 50 consists of finding the ECM channels present in the $P\text{-}ECM_c$, $R\text{-}ECM_c$, $SC\text{-}ECM_i$ messages in the signal attached to the service broadcasting the content.

Step 51 is only carried out if the $R\text{-}ECM_c$ message is missing from the broadcast. Another condition is that the receiving terminal should have a two-directional switching device. Step 51 consists of connecting to an Authorisation Server, declining the identifier of the content to be recorded and the identity of the client terminal. According to known criteria of the Authorisation Server, this server outputs the $R\text{-}ECM_c$ necessary to record the content, on line.

In step 52, the $R\text{-}ECM_c$ message is presented to the security processor that checks recording access criteria and then memorises the key $KR_c$. Step 52 is only done if the $P\text{-}ECM_c$ message is broadcast.

In step 54, the message $P\text{-}ECM_c$ is recovered and is then stored unchanged in the header of the content storage file.

In step 56, the message $SC\text{-}ECM_i$ is recovered for each crypto-period i and is then presented to the security processor that decrypts it using the key $KR_c$ to recover a decrypted message $SC\text{-}ECM_i$ that is then recorded with the multiplex packets forming the content.

In one variant embodiment, these multiplex packets are encrypted locally (step 58) using a key $K_I$ generated in step 60 from attributes contained in the message $K\text{-}EMC_c$ and a parameter related to the identity of the decoder. By way of example, this parameter may be the serial number of the decoder, the unique identifier (UA) of the smart card, or the serial numbers of a hard disk installed in the receiving terminal.

Figure 4:
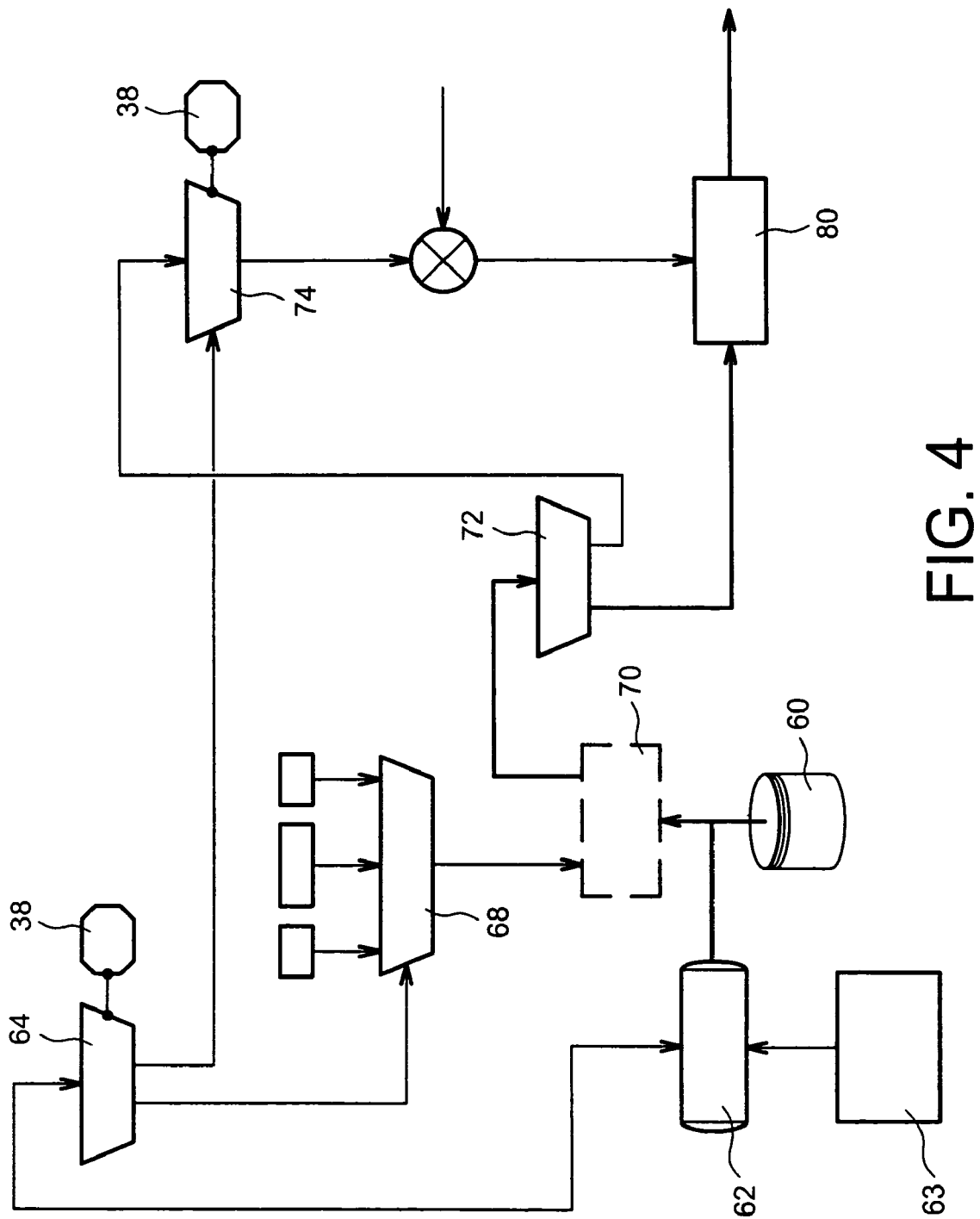

FIG. 4 diagrammatically shows the descrambling phase of a content recorded in a recording support 60 in order to read it.

Step 62 consists of searching for the message $P\text{-}ECM_c$ in the header of the file containing the dataflow.

The next step 63 is only done if the message $P\text{-}ECM_c$ is missing from the header of the containing file. Another condition is that the terminal should have a two-directional communication device.

Step 63 consists of connecting to an Authorisation Server, and stating the identifier of the content to be read and the identity of the client terminal. According to known criteria of the Authorisation Server, this server puts $P\text{-}ECM_c$ necessary to read the content on line.

In step 64, the found message $P\text{-}ECM_c$ is presented to the security processor that checks read access criteria, and then memorises the playback key $KP_c$ in the smart card 38.

If the content has previously been scrambled locally in accordance with step 58 described above, the local identity key $K_I$ is then calculated from identity information of the receiving terminal (step 68), and the multiplex of the content is, decrypted for each crypto-period i while reading using the key $K_I$ (step 70).

In one preferred embodiment of the invention, while playing back, the key $K_I$ is regenerated from attributes contained in the message P-ECM and at least one parameter related to the identity of the receiving terminal, and is used to decrypt the recorded content.

In step 72, the current message $SC\text{-}ECM_i$ is recovered and presented to the security processor (step 74) that decrypts it with the key $KP_c$ to check read access criteria CRP and to recover the control words $CW_{i-1}$, $CW_i$, $CW_{i+1}$ and the parity of i. One of the descrambling keys ECW or OCW is supplied to the descrambler to descramble the data segment $S_i$, depending on the required reading direction.

If the segment $S_i$ is to be displayed directly, the method according to the invention can be used to find the ECM channel and the index of $ECM_i$ values in the signal attached to the service broadcasting the content at each change of i and to apply $ECM_i$ to the security processor to recover even and odd control words OCW, ECW and to apply them to the descrambler 80.

The invention claimed is:

1. Access control method controlling access to a broadcast digital dataflow previously scrambled using an encryption key CW transmitted in encrypted form in an entitlement control message ECM also including at least one access control criterion CA, said numeric data possibly being recorded as such in a receiving terminal or decrypted during transfer, wherein:

on transmission:
  generating an entitlement control message $R\text{-}ECM_c$ for recording the content of the flow as a function of a recording key $KR_c$ and at least one criterion CRR defining a right to record,
  generating an entitlement control message $P\text{-}ECM_c$ controlling access to play back the content of the recorded flow as a function of a playback key $KP_c$ and at least one criterion CRP defining a right to play back, and
on reception:
  analyzing the message $R\text{-}ECM_c$, and
  authorizing the recording if the criterion CRR is verified, otherwise prohibiting recording,
  analyzing the message $P\text{-}ECM_c$, and
  authorizing the playback if the criterion CRP is verified, otherwise prohibiting the playback,
wherein the keys CW, $KR_c$ and $KP_c$ are encrypted by a first service key $K_S$,
and wherein for a sending phase and for each dataflow:
  breaking down a scrambling period into a sequence of crypto-periods $CP_i$ each defining a validity duration of an individual key $CW_i$, and at each crypto-period change,
  scrambling the content of the flow using the key $CW_i$, and memorizing a value p(i) representative of the parity of i,
  calculating an entitlement control message $SC\text{-}ECM_i$ as a function of the previously defined encryption keys $CW_{i-1}$, $CW_i$, $CW_{i+1}$, the value p(i) and the criterion $CA_i$, said message $SC\text{-}ECM_i$ being intended to transport access rights to a data segment $S_i$ corresponding to at least two crypto-periods,
  encrypting the keys $CW_{i-1}$, $CW_i$, $CW_{i+1}$, using the playback key $KP_c$,
  encrypting the result of the encryption in the previous step using a second service key $K'_s$,
  encrypting the result of the encryption in the previous step using the recording key $KR_c$.

2. Method set forth in claim 1, characterised in that the keys CW, $KR_c$ and $KP_c$ are encrypted by three different service keys, namely $K_s$, $K_{sr}$ and $K_{sp}$ respectively.

3. Method set forth in claim 1, characterised in that the emission phase also includes the following steps:
  calculating the entitlement control message $ECM_i$=f $[(ECW_i, OCW_i, CA)]$ wherein $ECW_i$ and $OCW_i$ represent the even and odd control words previously encrypted using a first service key $K_S$, respectively
  $ECW_i = CW_i$ if i is even, otherwise $ECW_i = CW_{i+1}$;
  $OCW_i = CW_i$ if i is odd, otherwise $OCW_i = CW_{i+1}$ broadcasting parameters in the ECM signal, identifying the ECM channels attached to the service broadcasting the content of messages $ECM_i$, $P\text{-}ECM_c$, $R\text{-}ECM_c$, $SC\text{-}ECM_i$,
  providing the $ECM_i$, $P\text{-}ECM_C$, $R\text{-}ECM_c$, $SC\text{-}ECM_i$ messages to the receiving terminal.

4. Method set forth in claim 3, characterised in that the $ECM_i$, $P\text{-}ECM_c$, $R\text{-}ECM_0$, $SC\text{-}ECM_i$ messages are broadcast on ECM channels associated with the content of segment $S_i$.

5. Method set forth in claim 3, characterised in that the R-ECM message is output to the receiving terminal on request from an Authorisation Server at the network entry.

6. Method set forth in claim 3, characterised in that the P-ECM message is output to the receiving terminal on request from an Authorisation Server at the network entry.

7. Method set forth in claim 4, characterised in that the reception phase includes the following steps:
  recovering the ECM channel from the $ECM_1$ message, using the signal attached to the service broadcasting the dataflow, and at each change of i,
  analysing the message $ECM_i$ so as to recover the even control word OCW and the odd control word ECW, to descramble the content of the broadcast flow so as to obtain direct access to this content.

8. Method set forth in claim 4, characterised in that the reception phase includes the following steps:
  recovering the ECM channel from the $P\text{-}ECM_c$, $R\text{-}ECM_c$, $SC\text{-}ECM_i$ messages, from the signal attached to the service broadcasting the content;
  analysing the $R\text{-}ECM_c$ message to verify record access criteria CRR,
  memorising the recording key $KR_c$
  recovering the message $P\text{-}ECM_c$ and store it with the content; and
  for each crypto-period i:
  recovering the message $SC\text{-}ECM_i$,
  decrypting the message $SC\text{-}ECM_i$ using the recording key $KR_c$, and
  recording the decrypted message $SC\text{-}ECM_1$ with the content.

9. Method set forth in claim 4, characterised in that playback access to the content in the recorded flow is obtained according to the following steps:
  recovering the message $P\text{-}ECM_c$ in the content and analyse it to verify read access criteria CRP,
  memorising the playback key $KP_c$; and
  recovering the current $SC\text{-}ECM_1$ message in the content;
  decrypting the $SC\text{-}ECM_i$ message with the playback key $KP_c$ and verify access criteria,
  recovering the encrypted keys $CW_{i+1}$, $CW_i$, $CW_{i+1}$ and the value p(i) indicating the parity of i, and
  decrypting said keys depending on the read direction to deduce ECW and OCW from them; then
  applying either ECW or OCW to descramble the content when playing back.

10. Method set forth in claim 4, characterised in that access to play back the content of the flow is obtained according to the following steps:
  recovering the message $P\text{-}ECM_c$ in the content,
  analysing the message $P\text{-}ECM_c$ to verify read access criteria CRP,
  memorising $KP_c$, and
  recovering the current SC-ECM message in the content,
  decrypting the $SC\text{-}ECM_i$ message with the second service key $K'_s$ and verify access criteria,
  recovering the encrypted keys $CW_{i+1}$, $CW_i$, $CW_{i+1}$ and the value p(i) indicating the parity of i, and decrypting said keys depending on the direction of reading to deduce ECW and OCW; then
applying either ECW or OCW to descramble the content.

11. Method set forth claim 8, characterised in that the reception phase also includes the following steps:
generating a local key $K_I$ from attributes contained in the message R-ECM and at least one parameter related to the identity of the receiving terminal,
locally over-encrypting the content to be recorded with this key $K_I$,
when playing back, regenerating the key $K_I$ using attributes contained in the message P-ECM and at least one parameter related to the identity of the receiving terminal,
decrypting the recorded content using the 10 regenerated key $K_I$.

12. Method set forth claim 9, characterised in that the reception phase also includes the following steps:
generating a local key $K_I$ from attributes contained in the message R-ECM and at least one parameter related to the identity of the receiving terminal,
locally over-encrypting the content to be recorded with this key $K_I$,
when playing back, regenerating the key $K_I$ using attributes contained in the message P-ECM and at least one parameter related to the identity of the receiving terminal,
decrypting the recorded content using the 10 regenerated key $K_I$.

13. Access control method controlling access to a broadcast digital dataflow previously scrambled using an encryption key CW transmitted in encrypted form in an entitlement control message ECM also including at least one access control criterion CA, said numeric data possibly being recorded as such in a receiving terminal or decrypted during transfer, wherein:
on transmission:
generating an entitlement control message $R\text{-}ECM_c$ for recording the content of the flow as a function of a recording key $KR_c$ and at least one criterion CRR defining a right to record,
generating an entitlement control message $P\text{-}ECM_c$ controlling access to play back the content of the recorded flow as a function of a playback key $KP_c$ and at least one criterion CRP defining a right to play back, and
on reception:
analysing the message $R\text{-}ECM_c$, and
authorizing the recording if the criterion CRR is verified, otherwise prohibiting recording,
analyzing the message $P\text{-}ECM_c$, and
authorizing the playback if the criterion CRP is verified, otherwise prohibiting the playback,
wherein the keys CW, $KR_C$ and $KP_C$ are encrypted by a first service key $K_S$,
and wherein for a sending phase and for each dataflow:
breaking down a scrambling period into a sequence of crypto-periods $CP_i$ each defining a validity duration of an individual key $CW_i$, and at each crypto-period change,
scrambling the content of the flow using the key $CW_i$, and memorizing a value p(i) representative of the parity of i,
calculating an entitlement control message $SC\text{-}ECM_i$ as a function of the previously defined encryption keys $CW_{i+1}$, $CW_1$, $CW_{i+1}$, the value p (i) and the criterion $CA_i$, said message $SC\text{-}ECM_1$ being intended to transport access rights to a data segment $S_i$ corresponding to at least two crypto-periods,
encrypting the keys $CW_{i+1}$, $CW_i$, $CW_{i+1}$, using a second service key $K'_S$,
encrypting the result of the encryption in the previous step using the key $KP_c$,
encrypting the result of the encryption in the previous step using the recording key $KR_c$.

14. Method set forth claim 13, characterised in that the emission phase also includes the following steps:
calculating the entitlement control message $ECM_i = f[(ECW_i, OCW_i, CA)]$ wherein $ECW_i$ and $OCW_i$ represent the even and odd control words previously encrypted using a first service key $K_S$, respectively
$ECW_i = CW_i$ if i is even, otherwise $ECW_i = CW_{i+1}$;
$OCW_i = CW_i$ if i is odd, otherwise $OCW_i = CW_{i+1}$
broadcasting parameters in the ECM signal, identifying the ECM channels attached to the service broadcasting the content of messages $ECM_i$, $P\text{-}ECM_c$, $R\text{-}ECM_c$, $SC\text{-}ECM_i$,
providing the $ECM_i$, $P\text{-}ECM_c$, $R\text{-}ECM_c$, $SC\text{-}ECM_i$ messages to the receiving terminal.

15. Access control method controlling access to a broadcast digital dataflow previously scrambled using an encryption key CW transmitted in encrypted form in an entitlement control message ECM also including at least one access control criterion CA, said numeric data possibly being recorded as such in a receiving terminal or decrypted during transfer, wherein:
on transmission:
generating an entitlement control message $R\text{-}ECM_c$ for recording the content of the flow as a function of a recording key $KR_c$ and at least one criterion CRR defining a right to record
generating an entitlement control message $P\text{-}ECM_c$ controlling access to play back the content of the recorded flow as a function of a playback key $KP_c$ and at least one criterion CRP defining a right to play back, and
on reception:
analysing the message $R\text{-}ECM_c$, and
authorizing the recording if the criterion CRR is verified, otherwise prohibiting recording,
analyzing the message $P\text{-}ECM_c$, and
authorizing the playback if the criterion CRP is verified, otherwise prohibiting the playback,
wherein the broadcast digital dataflow is of audiovisual programs.

16. Access control system controlling access to a digital dataflow including a scrambling platform including at least one generator of entitlement control messages ECM and at least one descrambling receiver (4) provided with a security processor, characterized in that the scrambling platform also includes:
a generator of entitlement control messages $R\text{-}ECM_c$ when recording the content of the received flow and a generator of entitlement control messages $P\text{-}ECM_c$ when playing back the content of a recorded flow, and in that the descrambling receiver, includes:
means of recovering the ECM channel from $P\text{-}ECM_c$, $R\text{-}ECM_c$ messages,
means of decrypting the content of a received flow to record it, and
means of decrypting the content of a recorded flow to play it back, means for breaking down a scrambling period into a sequence of crypto-periods $CP_i$ each defining a validity duration of an individual key $CW_i$, and at each crypto-period change, means for scrambling the content of the flow using a key $CW_1$, and memorizing a value p(i) representative of the parity of i, calculating an entitlement control message SC-$ECM_i$ as a function of previously defined encryption keys $CW_{i-1}$, $CW_i$, $CW_{i+1}$, the value p(i) and a criterion $CA_i$, said message SC-$ECM_i$ being intended to transport access rights to a data segment $S_i$ corresponding to at least two crypto-periods, encrypting the keys $CW_{i-1}$, $CW_i$, $CW_{i+1}$, using the playback key $KP_c$, encrypting the result of the encryption in the previous step using a second service key $K'_s$, encrypting the result of the encryption in the previous step using the recording key $KR_c$.

17. System set forth in claim 16, characterised in that the descrambling receiver also includes means of generating a local key $K_f$ from attributes contained in the R-$ECM_c$ message and the identity of the receiving terminal to locally encrypt/decrypt the content of the received flow.

18. Scrambling platform including at least one generator of entitlement control messages ECM controlling access to a dataflow broadcast in scrambled form, characterised in that it also includes a generator of entitlement control messages R-$ECM_c$ to control recording the content of a received flow and a generator of entitlement control messages P-$ECM_c$ to control play back the content of a recorded flow, and further including:

means of breaking down the scrambling period into a sequence of crypto-periods $CP_i$ each defining a validity duration of an individual key $CW_i$, means of encrypting the content of the flow at each change of the crypto-period i using the key $CW_i$, means of calculating an entitlement control message SC-$ECM_i$ as a function of the keys $CW_{11}$, $CW_1$, $CW_{i-1}$ corresponding to crypto-periods $CP_i$, $CP_{i-1}$ and $CP_{i+1}$ respectively, a parity parameter p(i) and the access control criterion $CA_1$, said message SC-$ECM_i$ being intended to carry access rights to a data segment ~1 corresponding to at least two crypto-periods, means of encrypting the keys $CW_{i-1}$, $CW_i$, $CW_{i+1}$ using a playback key $KP_c$, means of encrypting the encryption result in the previous step using a second service key $K'_s$, means of encrypting the result of the encryption in the previous step using a record key $KR_c$.

19. Scrambling platform including at least one generator of entitlement control messages ECM controlling access to a dataflow broadcast in scrambled form, characterised in that it also includes a generator of entitlement control messages R-$ECM_c$ to control recording the content of a received flow and a generator of entitlement control messages P-$ECM_c$ to control play back the content of a recorded flow, and further including:

means of breaking down the scrambling period into a sequence of crypto-periods $CP_i$ each defining a validity duration of an individual key $CW_i$, means of encrypting the content of the flow at each change of the crypto-period i using the key $CW_i$, means of calculating an entitlement control message SC-$ECM_1$ as a function of the keys $CW_{i-1}$, $CW_i$, $CW_{i+1}$ corresponding to crypto-periods $CP_i$, $CP_{i-1}$ and $CP_{i+1}$ respectively, a parity parameter p(i) and the access control criterion $CA_i$, said message SC-$ECM_i$ being intended to carry access rights to a data segment Si corresponding to at least two crypto-periods, means of encrypting the encryption result in the previous step using a second service key $K'_s$, means of encrypting the control words $CW_{i+1}$, $CW_i$, $CW_{i+1}$ using a playback key $KP_c$, means of encrypting the encryption result in the previous step using a record key $KR_c$.

20. Descrambling receiver (4) of a dataflow broadcast in scrambled form using a scrambling key $CW_1$ including a security processor including at least one key $KR_c$ intended to descramble record entitlement control messages R-$ECM_c$ and at least one key $KP_c$ intended to descramble the play back entitlement control messages P-$ECM_0$, receiver characterised in that it includes:

means of recovering the ECM channel from P-$ECM_c$ messages, and R-$ECM_c$ messages from the signal attached to the service broadcasting the content;

means of decrypting messages R-$ECM_c$ using the record key $KR_c$ to verify the right to record the content of a received flow, means of decrypting messages P-$ECM_c$ using the key $KP_c$ to verify the right to play back the content of a recorded flow, means for breaking down a scrambling period into a sequence of crypto-periods $CP_i$ each defining a validity duration of an individual key $CW_i$, and at each crypto-period change, means for scrambling the content of the flow using a key $CW_1$, and memorizing a value p(i) representative of the parity of i, calculating an entitlement control message SC-$ECM_i$ as a function of previously defined encryption keys $CW_{i-1}$, $CW_i$, $CW_{i+1}$, the value p(i) and a criterion $CA_i$, said message SC-$ECM_i$ being intended to transport access rights to a data segment $S_i$ corresponding to at least two crypto-periods, encrypting the keys $CW_{i-1}$, $CW_i$, $CW_{i+1}$, using the playback key $KP_c$, encrypting the result of the encryption in the previous step using a second service key $K'_s$, encrypting the result of the encryption in the previous step using the recording key $KR_c$.

21. Receiver set forth in claim 20, characterized in that it also includes means of generating a local key $K_f$ from attributes contained in the receiver identity message R-ECM and locally decrypt the content of the received flow.

22. Receiver set forth in claim 20, characterised in that the security processor is a smart card.

23. Access control method controlling access to a broadcast digital dataflow previously scrambled using an encryption key CW transmitted in encrypted form in an entitlement control message ECM also including at least one access control criterion CA, said numeric data possibly being recorded as such in a receiving terminal or decrypted during transfer, wherein:

on transmission:

generating an entitlement control message R-$ECM_c$ for recording the content of the flow as a function of a recording key $KR_c$ and at least one criterion CRR defining a right to record, generating an entitlement control message P-$ECM_c$ controlling access to play back the content of the recorded flow as a function of a playback key $KP_c$ and at least one criterion CRP defining a right to play back, and on reception:
- analysing the message R-ECM$_c$, and
- authorizing the recording if the criterion CRR is verified, otherwise prohibiting recording,
- analyzing the message P-ECM$_c$, and
- authorizing the playback if the criterion CRP is verified, otherwise prohibiting the playback, wherein the keys CW, KR$_c$ and KP$_c$ are encrypted by three different service keys, namely K$_s$, K$_{sr}$ and K$_{sp}$ respectively, and wherein for a sending phase and for each dataflow:
- breaking down a scrambling period into a sequence of crypto-periods CF$_i$ each defining a validity duration of an individual key CW$_i$, and at each crypto-period change,
- scrambling the content of the flow using the key CW$_1$, and memorise a value p(i) representative of the parity of i, ing an entitlement control message SC-ECM$_i$ as a function of the previously defined encryption keys CW$_{i-1}$, CW$_i$, CW$_{i+1}$, the value p(i) and the criterion CA$_i$, said message SC-ECM$_i$ being intended to transport access rights to a data segment S$_i$ corresponding to at least two crypto-periods,
- encrypting the keys CW$_{i-1}$, CW$_i$, CW$_{i+1}$, using the playback key KP$_c$,
- encrypting the result of the encryption in the previous step using a second service key K'$_s$,
- encrypting the result of the encryption in the previous step using the recording key KR$_c$.

24. Access control method controlling access to a broadcast digital dataflow previously scrambled using an encryption key CW transmitted in encrypted form in an entitlement control message ECM also including at least one access control criterion CA, said numeric data possibly being recorded as such in a receiving terminal or decrypted during transfer, wherein:

on transmission:
- generating an entitlement control message R-ECM$_c$ for recording the content of the flow as a function of a recording key KR$_c$ and at least one criterion CRR defining a right to record,
- generating an entitlement control message P-ECM$_c$ controlling access to play back the content of the recorded flow as a function of a playback key KP$_c$ and at least one criterion CRP defining a right to play back, and on reception:
- analysing the message R-ECM$_c$, and
- authorizing the recording if the criterion CRR is verified, otherwise prohibiting recording,
- analyzing the message P-ECM$_c$, and
- authorizing the playback if the criterion CRP is verified, otherwise prohibiting the playback, wherein the keys CW, KR$_c$ and KP$_c$ are encrypted by three different service keys, namely K$_s$, K$_{sr}$ and K$_{sp}$ respectively, and wherein for a sending phase and for each dataflow:
- breaking down the scrambling period into a sequence of crypto-periods CP$_i$ each defining a validity duration of an individual key CW$_i$, and at each crypto-period change,
- scrambling the content of the flow using the key CW$_i$, and memorise a value p(i) representative of the parity of i,
- calculating an entitlement control message SC-ECM$_i$ as a function of the previously defined encryption keys CW$_{i+1}$, CW$_i$, CW$_{i+1}$, the value p (i) and the criterion CA$_i$, said message SC-ECM$_1$ being intended to transport access rights to a data segment ~1 corresponding to at least two crypto-periods,
- encrypting the keys CW$_{i+1}$, CW$_i$, CW$_{i+1}$ using a second service key K'$_s$,
- encrypting the result of the encryption in the previous step using the key KP$_c$,
- encrypting the result of the encryption in the previous step using the recording key KR$_c$.

* * * * *

UNITED STATES PATENT AND TRADEMARK OFFICE
CERTIFICATE OF CORRECTION

PATENT NO. : 7,647,641 B2 Page 1 of 1
APPLICATION NO. : 10/584511
DATED : January 12, 2010
INVENTOR(S) : Dubroeucq et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 725 days.

Signed and Sealed this

Sixteenth Day of November, 2010

David J. Kappos
*Director of the United States Patent and Trademark Office*